US011847175B2

(12) United States Patent
Ferreira et al.

(10) Patent No.: US 11,847,175 B2
(45) Date of Patent: Dec. 19, 2023

(54) TABLE ROW IDENTIFICATION USING MACHINE LEARNING

(71) Applicant: Dell Products L.P., Round Rock, TX (US)

(72) Inventors: Paulo Abelha Ferreira, Rio de Janeiro (BR); Romulo Teixeira de Abreu Pinho, Niterói (BR); Pablo Nascimento Da Silva, Niterói (BR); Vinicius Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 17/586,494

(22) Filed: Jan. 27, 2022

(65) Prior Publication Data
US 2023/0237100 A1 Jul. 27, 2023

(51) Int. Cl.
*G06F 7/02* (2006.01)
*G06F 16/00* (2019.01)
*G06F 16/93* (2019.01)
*G06N 7/04* (2006.01)
*G06N 20/00* (2019.01)

(52) U.S. Cl.
CPC .............. *G06F 16/93* (2019.01); *G06N 7/046* (2013.01); *G06N 20/00* (2019.01)

(58) Field of Classification Search
CPC ...................................................... G06N 20/00
See application file for complete search history.

(56) References Cited

U.S. PATENT DOCUMENTS

| 11,630,956 | B2 * | 4/2023 | Yaramada | G06N 20/00 704/9 |
| 2010/0174725 | A1 * | 7/2010 | Adams | G06F 16/242 707/749 |
| 2021/0064860 | A1 * | 3/2021 | Tuma | G06F 16/93 |
| 2022/0318224 | A1 * | 10/2022 | Thompson | G06F 16/2282 |
| 2022/0405636 | A1 * | 12/2022 | Horiwaki | G06N 3/0464 |

OTHER PUBLICATIONS

De, Soumya, "Table Extraction using Deep Learning," Analytics Vidhya, Jun. 20, 2021, from https://medium.com/analytics-vidhya/table-extraction-using-deep-learning-3c91790aa200 (Year: 2021).*

* cited by examiner

*Primary Examiner* — Bruce M Moser
(74) *Attorney, Agent, or Firm* — Krishnendu Gupta; Deepika Bhayana; Derek Lam (57) ABSTRACT

Techniques for table row identification using machine learning are disclosed herein. For example, a method can include detecting a table body in a document by processing the document using a machine learning (ML)-based table body model; predicting an initial table row index for one or more words among a plurality of words obtained in the document, wherein the one or more words are determined to be within the table body; and determining a table row index for the one or more words using an ML-based table row model that is trained based on the predicted initial table row index for the one or more words.

20 Claims, 7 Drawing Sheets

| Prod. ID | Product description | Qty. | Item price |
|---|---|---|---|
| 123456 | Laptop XYZ 8GB RAM i5 SSD 15" | 1 | $ 999.99 |
| 234567 | Monitor WXY 32" widescreen | | $ 99.99 |
| 123456 | | 1 | 1199.99 |
| | | Total: | 2,299.97 |
| | | VAT: | 37.53 |

402 — Multi-line row
1st line: wide (new row)
2nd line: narrow (same row)

404 — Single-line row
1st line: wide (new row)

FIG. 4

Results from conventional approach 502    Results from example embodiments 504

TABLE ROW IDENTIFICATION USING MACHINE LEARNING

RELATED APPLICATIONS

This application is related to: (1) U.S. patent application Ser. No. 17/586,529, filed Jan. 27, 2022 and entitled "TABLE COLUMN IDENTIFICATION USING MACHINE LEARNING;" and (2) U.S. patent application Ser. No. 17/649,136, filed Jan. 27, 2022 and entitled "PREDICTION OF TABLE COLUMN ITEMS IN UNSTRUCTURED DOCUMENTS USING A HYBRID MODEL." The contents of each aforementioned application, filed the same day herewith, are incorporated by reference herein in their entireties for all purposes.

FIELD

Embodiments of the present invention generally relate to information extraction from documents. More particularly, at least some embodiments relate to systems, hardware, software, computer-readable media, and methods for identifying table rows for words in a document using machine learning.

BACKGROUND

Extracting information from unstructured documents having intrinsic layout information (such as, for example, scanned documents or text-based PDFs), can implicate difficult data management problems. For example, it can be desirable to extract information from purchase orders received from customers so as to automate a portion of the order booking process for an enterprise. Additionally, some corporate standards and corporate policies can benefit from automated information extraction so as to promote the correct classification, labeling, and protection of data, documents, and emails.

SUMMARY

In one embodiment, a method comprises detecting a table body in a document by processing the document using a machine learning (ML)-based table body model; predicting an initial table row index for one or more words among a plurality of words obtained in the document, wherein the one or more words are determined to be within the table body; and determining a table row index for the one or more words using an ML-based table row model that is trained based on the predicted initial table row index for the one or more words.

In some embodiments, the table row model can be a graph neural network (GNN) model. In addition, the table row model can be further trained using an error function that minimizes an error associated with determining a row transition based on the initial table row index for the one or more words determined to be within the table body. In addition, the method can further include detecting a table header in the document by processing the document using an ML-based table header model. In addition, the table row model can be further trained based on determining whether one or more words among the obtained words are within the table header. In addition, the table body model or the table header model can be an ML-based computer vision model that is trained using supervised learning. In addition, the method can further include determining a table row for the one or more words determined to be within the table body based on the table row index. In addition, the table row index can be a real number, and the determining the table row can further include applying a rounding function to the table row index. In addition, the document can be selected among a corpus of documents, and the table row model can be trained based on the initial table row index for the one or more words for the documents in the corpus. In addition, the document can be selected among a corpus of documents, each document in the corpus being annotated, and the plurality of words can be obtained by processing the document using optical character recognition and an ML-based word model trained based on the annotated documents. In addition, the plurality of words can be obtained using a document-type-specific information extraction tool.

Other example embodiments include, without limitation, apparatus, systems, methods, and computer program products comprising processor-readable storage media.

Other aspects of the invention will be apparent from the following description and the appended claims.

BRIEF DESCRIPTION OF THE DRAWINGS

The foregoing summary, as well as the following detailed description of exemplary embodiments of the invention, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

In the drawings.

DETAILED DESCRIPTION

Embodiments of the present invention generally relate to information extraction from documents. More particularly, at least some embodiments relate to systems, hardware, software, computer-readable media, and methods for identifying table rows for words in a document using machine learning.

Disclosed herein are example embodiments for identifying and extracting line-items from documents, such as line-items contained in tables of unstructured documents. More specifically, example embodiments are configured to apply a rule-based approach in combination with a machine-learning-based table row model to extract line-items from unstructured documents.

The following includes a discussion of problems that may be resolved, or avoided, by example embodiments. This discussion is not intended, nor should be construed, to limit the scope of the invention in any way.

A technical problem involves data management relating to extracting information from unstructured documents with intrinsic layout information (e.g., scanned documents or text-based PDFs). For example, automated information extraction would be a useful technical solution to extract information from incoming purchase orders from customers so as to enable automating part of the order booking process. In another example, corporate standards and policies may impose requirements for correct classification, labeling and protection of data, documents, and emails. For example, existing information technology systems may impose a categorization according to well-defined rules based on the origin, destination, purpose, and content of the extracted information.

In both example uses there is specific information that is beneficial to extract from the documents. For example, in the purchase order domain, when a customer wishes to place an order for products, a purchase order document is generally received including all information regarding the list of products that the customer wish to buy, along with the delivering address, contact information, quote number, and the like. Enterprises may have internal processes whereby, for example, an employee reads the received document and manually checks if all the information is correct, which can be time-consuming. The technical solutions described herein are configured to automatically identify and extract a set of fields from unstructured documents to extract and/or understand and classify relevant parts of the document's content.

In particular, applicable technical problems addressed herein include identification and extraction of list elements in unstructured documents (e.g., rows in a table for purchase orders). Example technical problems associated with information extraction from unstructured documents can include the following:
1. Automating the process of extracting line items from unstructured documents using, for example, machine learning
2. Table layout variability, since tables come in many shapes and formats
3. Open-ended word content, since all possible words that could be present in a table are unknowable
4. Unlimited number of items in associated lists: for instance, a system cannot know in advance the number of associated table rows to process; therefore, technical problems arise when processing a potentially unlimited number of elements (e.g., document words and table rows).

Table extraction in unstructured documents, for instance, is a difficult computer research problem. Conventional methods using, e.g., graph neural networks, have been developed to allow for table extraction through interpreting a document as a graph of words. However, such conventional methods still rely on strong assumptions around word features, pre-processing, and post-processing.

Example embodiments discussed herein provide technical solutions to the technical problems articulated above. More specifically, example embodiments provide an automatic method for extracting line-items (e.g., table rows) from unstructured documents.

Technical solutions to these technical problems, such as the example embodiments disclosed herein, are configured to combine rule-based algorithms with machine learning, such as graph neural networks as discussed in further detail herein to classify elements with their correct table row.

In addition to document data collection and annotation for training purposes in connection with machine learning, example embodiments of the present information extraction system are configured to leverage a three-step process:
1. Detect a table region using, for example, a table body model in combination with a table header model, where the models are trained specifically for detection of the region comprising a table's body and header. In some embodiments, the table body and table header models can be computer-vision deep neural network (DNN) models.
2. Predict an initial table row index for the words determined to be within the table body. In some embodiments, a tailor-made rule-based approach is configured to determine an initial table row index to each element (e.g., each word in a table), based on the detected table region.
3. Determine a table row index for the words using, for example, a trained table row model. In some embodiments, the table row model can be a graph neural network (GNN) model where output from the initial table row prediction enriches the graph input to the GNN, thereby allowing for more accurate predictions of the table row associated with each element (e.g., each word in the table region).

Digital transformation and artificial intelligence (AI) can greatly contribute to the area of data management. One important aspect of data management is document data management, where automatic digital processing can greatly improve efficiency and compliance. Data management can benefit from application of AI methods to data management when processing internal and customers' documents.

Information extraction from documents can improve data management techniques by allowing for automatic methods to understand, sort and process documents from different customers and documents pertaining to enterprises' internal processes. Enterprises can benefit greatly from having an automatic and low-cost method for obtaining this information to classify or extract content, for example to support process automation or compliance purposes of internal and customers' document data.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout this application, elements of figures may be labeled as 'a' to 'n'. As used herein, the aforementioned labeling means that the element may include any number of items and does not require that the element include the same number of elements as any other item labeled as 'a' to 'n'. For example, a data structure may include a first element labeled as 'a' and a second element labeled as 'n'. This labeling convention means that the data structure may include any number of the elements. A second data structure, also labeled as 'a' to 'n', may also include any number of elements. The number of elements of the first data structure and the number of elements of the second data structure may be the same or different.

Throughout the application, ordinal numbers (e.g., first, second, third, etc.) may be used as an adjective for an element (e.g., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Figure 1:
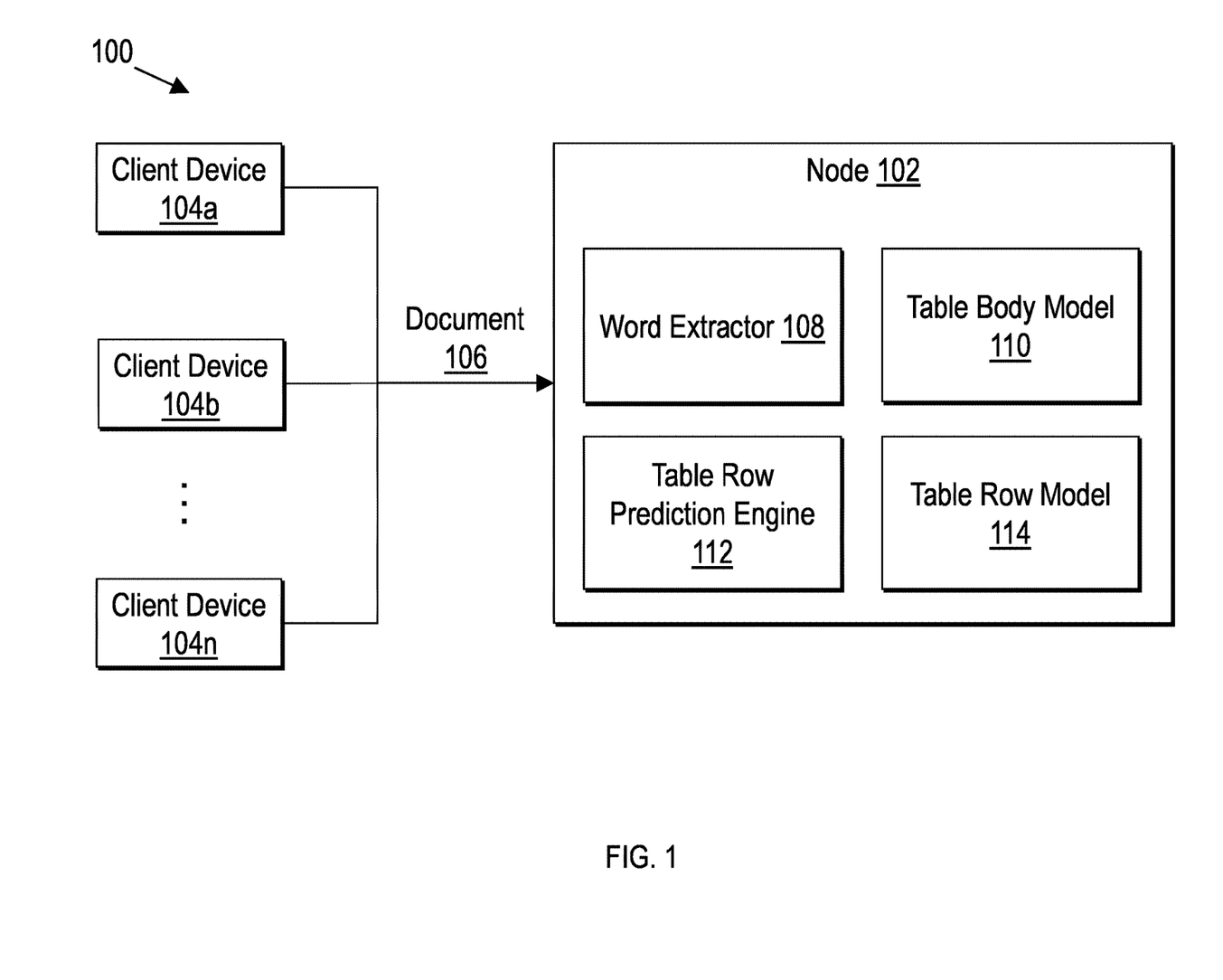
FIG. 1 illustrates aspects of an information extraction system in accordance with example embodiments.

FIG. 1 shows aspects of an information extraction system in accordance with example embodiments. FIG. 1 illustrates an information extraction system 100 including a node 102 in communication with client devices 104a, 104b, . . . , 104n. The node is configured for extracting information from documents 106, as described in further detail below.

In example embodiments, the client devices 104a, 104b, . . . , 104n (sometimes referred to herein collectively as client devices 104) represent devices, a system of computers, a network, a datacenter, or the like. The client devices are configured to transmit one or more documents 106 to the node 102.

In example embodiments, the document 106 may be a data structure (e.g., a file) that includes data that may be used to perform services for users of the system 100 (e.g., clients). By way of example and not limitation, the document can include a purchase order, an inventory manifest, and other and/or additional types of documents without departing from the scope of the invention. The document is unstructured, meaning that the document is generally freeform and lacks a formal structure but is still able to be scanned or otherwise captured and imported into the information extraction system 100.

The documents may include training documents and live documents. Training documents may include documents that have been processed and are annotated with, for example, a reference to one or more field values of interest associated with the document. Training documents may be used to train and verify machine learning models, such as the table body model 110 and the table row model 114. Live documents may include documents that have not been processed and do not include a reference to the one or more fields values of interest associated with the document.

In example embodiments, the node 102 includes a word extractor 108, a table body model 110, a table row prediction engine 112, and a table row model 114. The node is configured to communicate with the client devices 104, e.g., to receive one or more documents 106 for processing from a client device.

In example embodiments, the node 102 is configured to perform an automatic method for extracting line-items, such as table rows, from unstructured documents.

Example embodiments of the automatic method include the following general steps:

(1) document data collection and annotation, for example using the word extractor 108;
(2) processing the document using any number of table body models 110 to detect table body boundaries;
(3) predicting an initial table row index by applying, for example, a table row prediction engine 112 configured to pre-detect line-items; and
(4) determining a table row index by applying, for example, any number of table row models 114 configured to refine the initial table row index and ultimately determine a table row associated with elements (e.g., with words in the table).

Further details are provided below regarding the above-described steps, including training and inference phases for the respective machine-learning-based models, where applicable. Results for an example large dataset of purchase orders are also discussed in further detail below in connection with FIG. 5.

It is to be appreciated that this particular arrangement of modules 108, 110, 112, 114 illustrated in the node 102 of the FIG. 1 embodiment is presented by way of example only, and alternative arrangements can be used in other embodiments. For example, the functionality associated with modules 108, 110, 112, 114 in other embodiments can be combined into a single module, or separated across a larger number of modules. As another example, multiple distinct processors and/or memory elements can be used to implement different ones of modules 108, 110, 112, 114 or portions thereof. At least portions of modules 108, 110, 112, 114 may be implemented at least in part in the form of software that is stored in memory and executed by a processor.

It is also to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the models disclosed herein to abstract concepts; instead, each model herein has a practical application in a processing device in the form of stored executable instructions and data that implement the model using the processing device.

Figure 2:
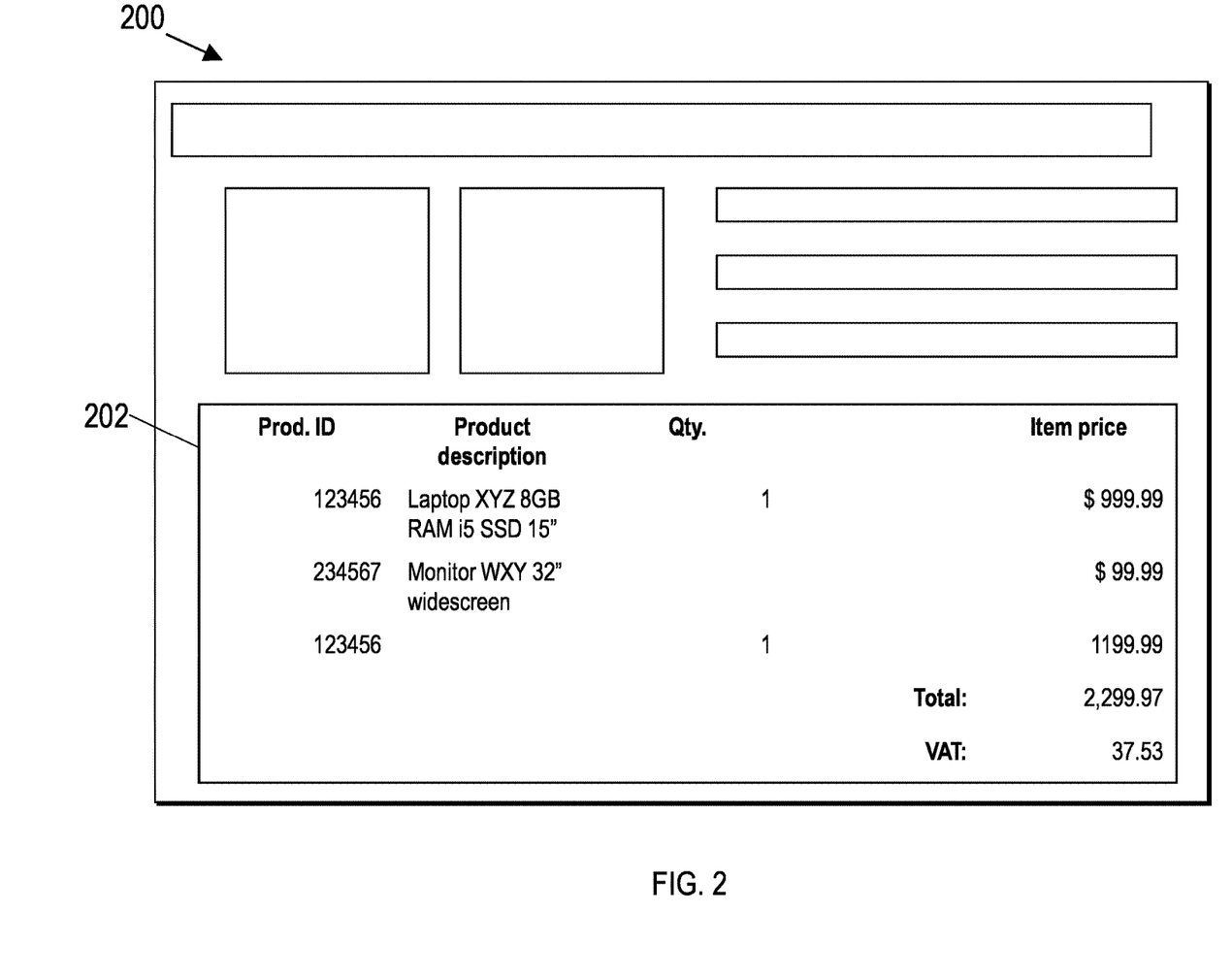
FIG. 2 illustrates aspects of an example document in accordance with example embodiments.

FIG. 2 shows aspects of a document in accordance with example embodiments. The document 200 (an example of the document 106 (FIG. 1)) includes a table 202.

The document 200 may be, by way of example and not limitation, a purchase order of the type typically received by suppliers to indicate a customer order. Example embodiments of the information extraction system are configured to obtain words from the document. The information extraction system may also be configured to obtain word positions corresponding to the words. Example pre-processing of the document can include generating a list of words and associated word positions (e.g., coordinates of a bounding box corresponding to each word). In example embodiments, this task can be executed via optical character recognition (OCR) if the document is in the form of (e.g., scanned) images. OCR tools may be used, such as Tesseract or any other OCR tools of the type generally known to one having ordinary skill in the art.

In alternative example embodiments, the present system is configured to obtain the words and/or word positions using a document-type-specific information extraction tool. For example, a document in digital form, such as in Portable Document Format (PDF), may already contain the words and word positions in the desired format, for example as metadata. Programming libraries and frameworks of the type generally known to one having ordinary skill in the art may support extraction of words and graphical elements from such digitized documents, e.g., pdfplumber for the Python programming language.

Table 202 can be contained in the document 200. In example embodiments, the present information extraction system is configured to extract line-items, examples of which may be found in tables such as the table 202.

It will be noted that the example document 200 and example table 202 illustrate some challenges common to documents in the problem domain of, for example, purchase orders: there can be information missing and/or misaligned (e.g., as seen in the second column ("Product") of the third row); the content may be unsorted and may repeat elements (e.g., as seen in the "Prod. ID" column); and the content may contain formatting inconsistencies (e.g., as seen in the third row element of the "Item price" column which omits a dollar sign as a currency marker).

Accordingly, example embodiments are configured to process table content without assuming or requiring any fixed alignment between row content and header words. Example embodiments are operable in a manner that is robust against missing elements (e.g., product description for the same product) and robust against content or elements that might not be important to a domain expert (e.g., total and VAT). Example embodiments are configured to process header words that may align differently among themselves (e.g., a product description header occupying two lines). In contrast, conventional methods that rely on purely rule-based or rigid script-based approaches encounter difficulties when applied to documents to extract these types of information. Further, overall difficulties are not limited to the ones exemplified above. Documents may also exhibit issues with inconsistencies in formatting, sorting, and graphical representation of elements in the table, as illustrated in the example document 200 and the example table 202 of FIG. 2.

Example embodiments facilitate automated extraction of content in documents. However, layout variability makes automation challenging and often requires specialized and sophisticated systems for, e.g., field information extraction. In effect, despite the existence of commercial solutions addressing information extraction from documents, the problem remains open and is a subject of state-of-the-art research in intersections between computer vision and natural language processing.

In addition to obtaining words and word positions from the document 200, example embodiments of the present information extraction system are also configured to leverage labeled documents that may be available, e.g., in an annotated corpus or data set of documents such as tens, hundreds, thousands, tens or hundreds of thousands, millions of documents, or the like. Advantageously, example embodiments of the present information extraction system are accordingly applicable to domains where human annotation (e.g., labeling) of documents is current practice.

In addition to obtaining data that is annotated by humans using simple annotation tools, the data can also be obtained based on usage of document processing software. For example, example embodiments can be configured to match pre-processed documents to their associated processed information. Any of the above-described methods could serve as a source of labeled data for use by example embodiments of the present information extraction system. The set of documents for which the field information is known is sometimes referred to herein as annotated documents. In alternative example embodiments, obtaining words and word positions may also involve processing a datastore or data set (e.g., a database) of documents using a word extractor (e.g., an OCR or a PDF reading tool) that obtains words and word positions in a digitized document.

Figure 3:
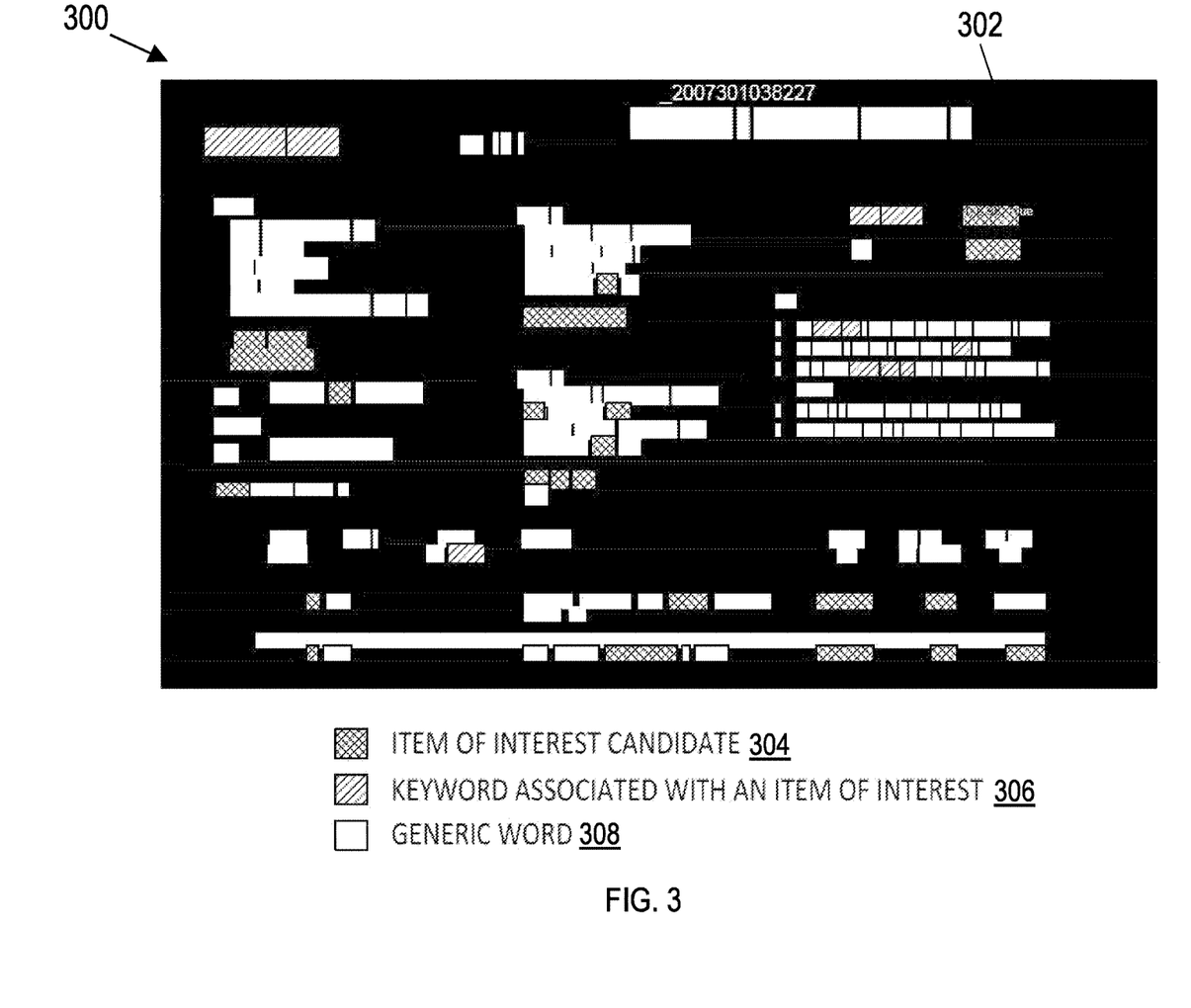
FIG. 3 illustrates aspects of detecting table regions in accordance with example embodiments.

FIG. 3 shows aspects of detecting table regions in accordance with example embodiments. Example embodiments apply an image mask 302 to a document 300 (an example of the document 106 (FIG. 1)) to detect table regions, such as a table body or a table header.

In example embodiments, the detecting the table body and table header can include processing a given document 300 using a table body model and a table header model. In some embodiments, the table body model and/or the table header model can be a computer vision model trained using supervised learning. For example, the computer vision model can be trained by performing supervised learning on a data set or corpus including training documents annotated with color-coded representation masks, such as the example image mask 302 annotating the example document 300. Detecting the table body and table header can be carried out, for example, using components and models such as further detailed in connection with FIG. 3, and/or one or more of the techniques disclosed in U.S. patent application Ser. No. 17/386,386, entitled "METHOD AND SYSTEM FOR GENERATING DOCUMENT FIELD PREDICTIONS" and filed Jul. 27, 2021, the entire contents of which are incorporated by reference herein for all purposes.

The document 300 illustrates an example purchase order document having an image mask 302 applied. The image mask 302 can be, for example, a color-coded representation mask. The regions 304 illustrate example candidate words for items of interest. The regions 306 illustrate example keywords associated with an item of interest. The regions 308 illustrate example generic words. The illustrated regions 304, 306, 308 can be represented by, for example, bounding boxes having associated position coordinates.

In example embodiments, the present information extraction system is configured to use the table body model and/or the table header model in connection with a training phase and an inference phase.

In a training phase, example embodiments are configured to train a table body model, a table header model, or a combination using an image mask 302 that is annotated as described above. In some embodiments, the table body model and the table header model can be an object detection deep neural network model.

Example embodiments of the present information extraction system exhibit several advantages compared to conventional machine-learning-based object detection systems. First, in example embodiments the present system may be configured to train two models for table detection. A table body model can be trained to detect a table body, and a table header model can be trained to detect a table header. Second, example embodiments are configured to annotate only keywords so as to detect general regions of interest within the document. This approach is faster and lighter weight than conventional approaches that focus on fields so as to detect specific items of interest within the document. Advantageously, the table body model and the table header model are useful in determining table row indices for words in the document. First, the models allow example embodiments of the present system to filter out words that are outside the table regions. Second, the differentiation between words in the table body and words in the table header can be leveraged as an input feature for training a table row model, as described in further detail below.

In example embodiments, during the training phase the table body model and table header model can be trained using supervised learning based on annotated data. That is, example embodiments of the present system are configured to perform supervised learning where the input is an unstructured document and the output of each model is a bounding box corresponding to an estimate for regions (e.g., boundaries) associated with the table's body or header. It will be appreciated that effectiveness of the training can improve if each document in the input corpus contains a table with a list of items, and such data and documents are annotated accordingly. In connection with purchase orders as an example problem domain, this condition is safely presumed to apply.

In an inference phase, example embodiments of the present system are configured to determine a position for a word of interest in a document by processing the document using the table body model or the table header model. More specifically, example embodiments are configured to infer or predict a position of a bounding box for an item of interest by processing an input document using the table body model or the table header model that is trained based on the geometrical (e.g., layout) relationships between keywords (e.g., regions 304, 306) and generic words (e.g., regions 308).

At inference time, example input includes an unlabeled unstructured document, and example embodiments are configured to predict a bounding box for an item of interest with an associated confidence score using the table body model and the table header model. Example embodiments of the present information extraction system are configured to map the predicted bounding boxes back to the document and allow the present system to identify all words inside the predicted table or table header. In other words, the table body model and the table header model allow example embodiments of the present system to determine, for each document, whether a given word is inside or outside the table body or header.

Figure 4:
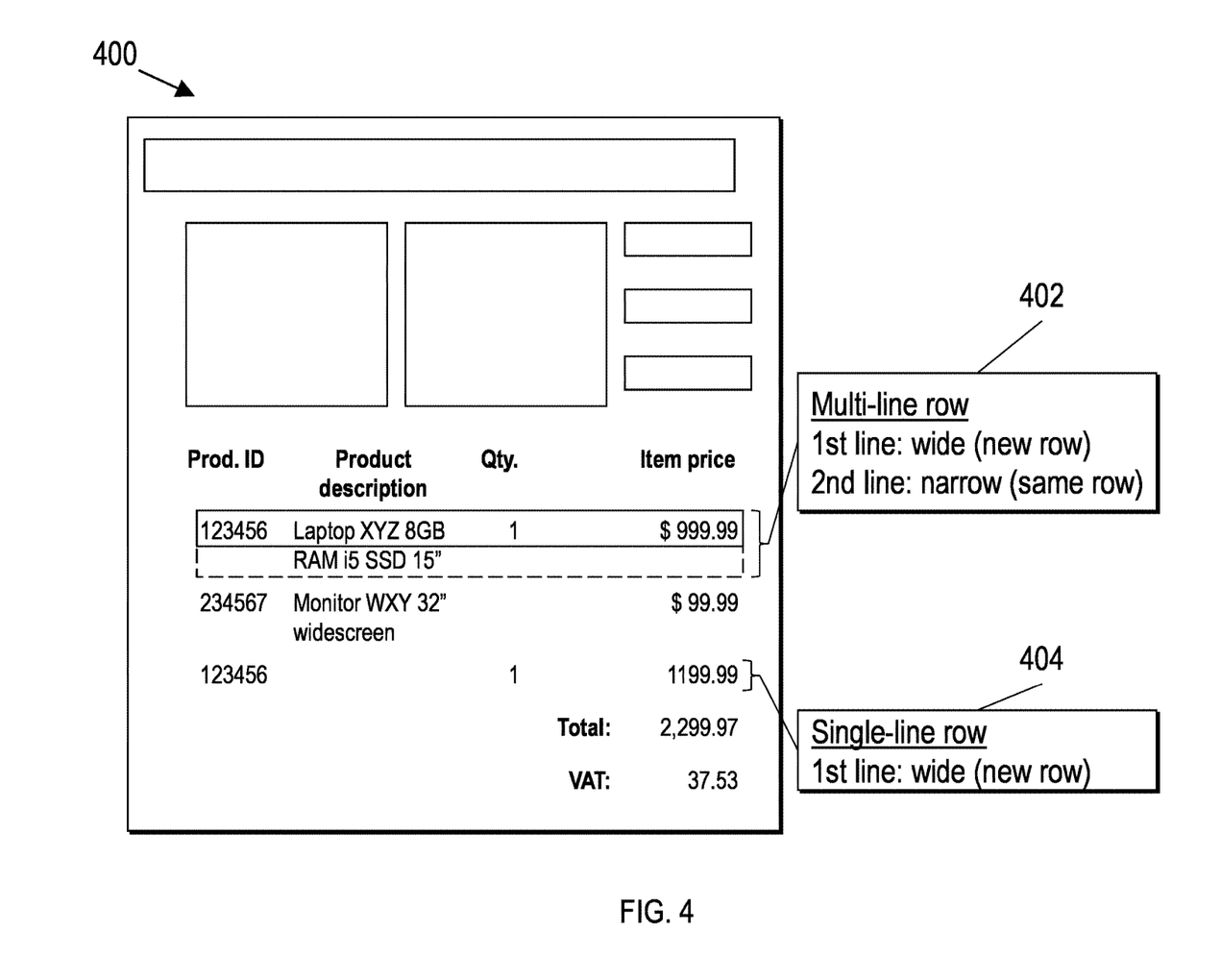
FIG. 4 illustrates aspects of predicting an initial table row index in accordance with example embodiments.

FIG. 4 shows aspects of predicting an initial table row index in accordance with example embodiments. FIG. 4 illustrates an example document 400 (an example of the document 106 (FIG. 1)) having an example multi-line row 402 and single-line row 404 for use in predicting an initial table row index.

Example embodiments are configured to predict an initial table row index for words that are determined to be within the table body. More specifically, example embodiments are configured to apply a rule-based approach that pre-assigns a corresponding initial table row index for each word inside the table body region. In example embodiments, the present system is configured to include the initial table row index as an input feature to the table row model, as described in further detail below.

FIG. 4 illustrates a conceptual framework for an example algorithm described in further detail below to assign initial table row indices to words in a table. Example embodiments of the present information extraction system are configured to detect table row boundaries whenever words occupying the same line cover a wide region of the table, as illustrated in FIG. 4. For example, one insight is that, typically, only the first line of a table row contains all fields identified in the table header (e.g., table columns). Additionally, the example algorithm discussed below accounts for multi-line rows, such as the multi-line row 402, in which only the descriptive fields (e.g., product names, addresses) tend to occupy each line, resulting in a narrower region when all words on the same line are considered together.

Although the example algorithm presented below provides one exemplary method, any approach for predicting initial table row indices for words in a table are contemplated as being within the scope of this invention.

Algorithm 1. Example rule-based method for assigning a row to each word in a document region (e.g., in a detected table).

| 1. | # Rule-based line-item prediction |
| --- | --- |
| 2. | |
| 3. | min_width_prop ← 0.9 |
| 4. | W: Set of words for a document region (excl. header) |
| 5. | unify_bottoms(W): Function for unifying words' bottoms |
| 6. | |
| 7. | W ← unify_bottoms(W) |
| 8. | region_width ← W.x1.max( ) – W.x0.min( ) |
| 9. | pred_row ← 0 |
| 10. | found_row ← False |
| 11. | GW ← W.groupby('y1') |
| 12. | for i, (y$_1$, W$_{y1}$) in GW: |
| 13. |    line_width ← W$_{y1}$.x1.max( ) – W$_{y1}$.x0.min( ) |
| 14. |    width_prop ← line_width / region_width |
| 15. |    if width_prop ≥ min_width_prop: |
| 16. |      if found_row: |
| 17. |          pred_row += 1 |
| 18. |          found_row ← True |
| 19. |    if pred_row == 0: |
| 20. |       pred_row ← 1 |
| 21. |    W$_{y1}$.pred_row ← pred_row |

The example algorithm disclosed above is configured to predict an initial table row index to each word within a given document region. For example, the document region may correspond to the table region detected in connection with FIG. 3, e.g., the table body. In addition, the example algorithm processes the document under the assumption that each word has (x0:left,y0:top,x1:right,y1:bottom) coordinates defining its bounding box. These coordinates (e.g., word positions) can be obtained using the example approaches described earlier, in connection with FIG. 2.

The example algorithm starts by unifying all words' bottom (line 7), that is, by assigning the same bottom (y1 coordinate) if and only if two words are bottom-aligned within a predetermined tolerance E. Advantageously, this ensures any minor mismatch between real-valued word bottoms would not make the words incorrectly appear to be at different lines.

Following this bottom-unification, the example algorithm proceeds to obtain the region's width (line 8), given by the maximum right value (x1) minus the minimum left value (x0) of every word in the region. The example algorithm then groups all words according to their bottom value (lines 9-11) and loops through these groups (lines 12-21), assigning a new row whenever the algorithm detects a line with a large enough proportional width with respect to the table's width (lines 14-21), such as the example single-line row 404. The threshold proportional width (e.g., "min_width_prop" in the example algorithm) is received as a predetermined hyperparameter to the example algorithm.

Example embodiments of the present system are configured to process an input document using a table row model. In example embodiments, the table row model can be a graph neural network (GNN) model. More specifically, the present system is configured to use the table row model to learn table row indices of each word inside a table of an unstructured document. The training and inference stages in connection with the table row model are discussed below.

A graph neural network (GNN) refers to a machine-learning-based model that receives as input a graph Γ=(N, E) represented by a set of nodes, N, connected by edges, E.

Features H associated with the graph nodes at each layer, l, of the network are transformed via a function of the features of the neighboring nodes and edges in the graph in the previous layer. That is, $h_{i,l+1}=f(h_{j,l}, e_{j,i,l}) \forall j \in \mathcal{N}(i)$, where $h_{i,l+1}$ refers to the features of node i at layer l+1, $h_{j,l}$ refers to the node features of the neighbors of node i at layer l, $e_{j,i,l}$ refers to the features of all incident edges of node i at layer l, and $\mathcal{N}(i)$ refers to the neighbors of node i. These successive transformations through multiple network layers generate an embedding of the nodes' features (e.g., a representation of similarity or relation between the nodes' features). The embedding can then be used as input for, e.g., classification or regression models.

Example embodiments of the present system are configured to process the table region of a document, e.g., a union of the table body and table header. In some embodiments, the table body and table header can be determined using the table body model and table header model as described above, in connection with FIG. 3. Therefore, input data for the table row model can comprise a fully connected graph whose nodes correspond to the words inside the detected table region (e.g., the table header and table body).

As node features, example embodiments of the present system are configured to combine (e.g., concatenate) the following values into a single feature vector used as input for the table row model:
 (1) the (x, y) coordinates of the center of the bounding box of each word, which provides a notion of layout of the table;
 (2) the proportion of digits in the word, which indicates the number of digits relative to the number of letters in each word;
 (3) a flag indicating whether a word belongs to the header of the table;
 (4) the predicted initial table row index, which provides a "first guess" of the table row index ultimate determined using the table row model.

As edge features, example embodiments of the present system are configured to combine (e.g., concatenate) two values into a single feature vector, such as, e.g., the (dx,dy) differences in position between the two words sharing the graph edge. Advantageously, these features can help provide a notion of the layout of the table.

In example embodiments, the output of the table row model is used to determine a table row index for each word in the table region. For example, the output can be a list of real numbers greater or equal to 0, one number corresponding to each input word (e.g., node). Advantageously, this flexible output allows example embodiments of the present system to have an unbounded prediction for the table row assignment (starting at 0).

In a training phase, example embodiments of the present system are configured to train the table row model using annotated data where the row index of each word, e.g., the target variable, is known a priori. These row indices can be used as labels in a supervised learning procedure, where the aim is to learn the parameters, θ, of a function $y=f(x|\theta)$ that minimizes an error between the predicted values, ŷ, and the true values, y.

In example embodiments, the table row model is further trained using an error function configured to minimize an error associated with determining a row transition. In example embodiments, this prediction error is used as an element in the learning process. Accordingly, example embodiments of the present system are configured to combine two error functions, as follows:

$$\varepsilon(y,\hat{y})=L_1(y,\hat{y})+\text{RowSortErr}(y,\hat{y}).$$

The function $L_1(y, \hat{y})=|y-\hat{y}|$ refers to the conventional $L_1$ norm used in many settings and known to one having ordinary skill in the art.

Example embodiments of the present system are configured to supplement the $L_1$ norm with an additional error function RowSortErr (y, ŷ). The error function is configured to leverage prior knowledge about a table's structure. Conceptually, if words in a table are sorted by their y coordinate, it is expected that words of the first table row will be the first, followed by the words on the second table row, followed by the words on the third table row, and so on. Numerically, table row indices of the sorted words will appear as a sequence, an example of which follows:

$$S=000\ldots00001111\ldots111122\ldots222\ldots$$

Example embodiments of the error function are configured to leverage a new generated sequence, S', based on the absolute difference between an element and the previous one, referred to here as δ(S). Accordingly, each table row transition will be marked with a 1 and all other elements will be 0, an example of which follows:

$$S'=000\ldots00001000\ldots000010\ldots000\ldots$$

In example embodiments, the sum of the elements of the sequence can be expected to be the total number of rows in the table minus one. Accordingly, in a perfect prediction by the table row model, such sum for the sorted sequences of y and y, ŷ can be expected to be equal. In example embodiments, therefore, the function RowSortErr (y, ŷ) can be defined as the following:

$$\text{RowSortErr}(y,\hat{y})=|\text{sum}(\delta(\text{sort\_rowwise}(y)))-\text{sum}(\delta(\text{sort\_rowwise}(\hat{y})))|$$

During the training phase, in example embodiments the table row indices used as targets refer to words inside the ground truth tables, and not to words inside the table regions predicted by way of the table body and table header models. Similarly, the preliminary guess (e.g., prediction) for the initial table row indices obtained via the rule-based algorithm and used as input for the table row model are also computed considering the ground truth table regions. This allows the table row model to learn the true word locations in the training dataset. In contrast, at inference time (as described in further detail below), example embodiments of the present system are configured to use the predicted table regions, since the ground truth is unavailable.

In an inference phase, example embodiments of the present system are configured to determine table row indices associated with a new (e.g., unannotated) input document, e.g. which was not part of the training set. The inference phase can include, but is not limited to, the following example steps:
 1. Process the document to obtain its list of words and associated word positions.
 2. Generate image masks as input to the trained table body model or table header model.
 3. Predict bounding boxes of the table header and table body, for example, by processing the document based on the image masks using the table header model and table body model.

4. Filter the word list to remove words whose word positions are located outside the predicted table regions based on the bounding boxes.
5. Predict an initial table row index for the words inside the table body, for example, using the rule-based algorithm described above on the words inside the table body, to obtain the initial table row index for each word in the table.
6. Construct a fully connected graph based on the words in the table and assemble the associated node and feature vectors for the graph.
7. Determine a table row index for each word in the table, for example, by processing the document using the trained table row model.

Figure 5:
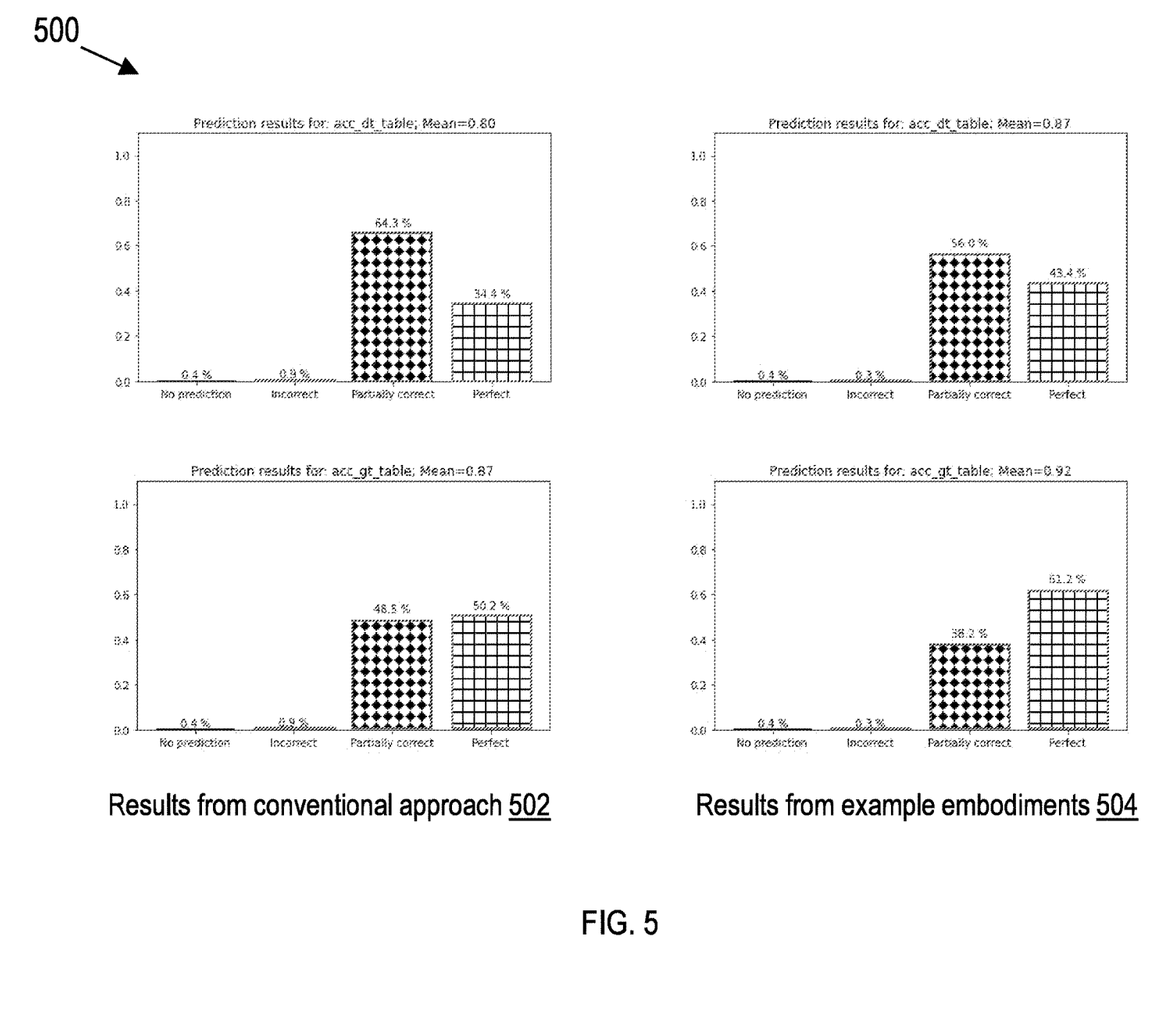
FIG. 5 illustrates aspects of prediction results for table row indices in accordance with example embodiments.

FIG. 5 shows aspects of prediction results for table row indices in accordance with example embodiments. FIG. 5 discloses an illustrative comparison of results 502 from a conventional approach and results 504 from an approach based on example embodiments of the present information extraction system.

The results 502 generally reflect application of a conventional rule-based method. The results 504 generally reflect a significant improvement when applying an approach based on the example embodiments disclosed herein. The top and bottom rows differentiate between applying the method on words inside table regions predicted using the table body and table header models (top), compared with applying the method on words inside the ground truth table regions of the annotated test data (bottom), respectively.

FIG. 5 illustrates results 502, 504 of experimental validation of the methods described above on an annotated dataset with 7,577 internal purchase order documents. First, the dataset was split into training (70%) and testing (30%) subsets. Next, the table body model and table header model were trained independently, to learn the locations of the table body and header, as described in connection with FIG. 3. Next, the example rule-based algorithm described above was applied on the training set, to predict an initial table row index for each word inside the ground truth table regions, as described in connection with FIG. 4. Finally, the graphs from the words in each table were constructed and used to train the table row model to determine the table row indices of each word based on the initial table row index and other input features, as described above.

The trained models were then used in the inference phase on the test data, as described above, and the quality of the determinations for the table row indices was measured. FIG. 5 illustrates four categories. The "Perfect" region indicates the proportion of documents for which the row indices for all words were correctly predicted. The "Partially correct" region indicates the proportion of documents for which some but not all table row indices were correctly predicted. The "Incorrect" region indicates the proportion of documents for which none of the predicted row indices were correct, and the "No Prediction" column indicates the proportion of documents for a prediction of row indices could not be obtained, for one reason or another. The left-hand side of FIG. 5 illustrates results 502 from a conventional rule-based algorithm alone. The right-hand side of FIG. 5 illustrates results 504 from an approach described herein based on example embodiments of the present system. The top row of FIG. 5 illustrates results obtained strictly following the example inference steps described above. That is, the example rule-based algorithm and table row model were applied on the words inside the table regions as detected using the table body and table header models. For comparison purposes, the bottom row of FIG. 5 illustrates results from applying the example rule-based algorithm and table row model on the words inside the ground truth table regions of the annotated test data. Finally, the top of each graph also lists mean accuracy of the prediction of table row indices.

With reference to the top row of FIG. 5, it will be noted that, after applying the example table row model described herein, overall accuracy increased to 87% (an about 10% increase), while the proportion of "Perfect" predictions reached 43.4% (an about 26% increase). In contrast, FIG. 5 illustrates that a conventional rule-based algorithm yielded results of about 80% overall mean prediction accuracy and about 34% "Perfect" predictions.

With reference to the bottom row of FIG. 5, similar behavior was observed in connection with predictions for words inside the ground truth table regions. It will additionally be noted that the overall accuracy reached about 92%. This overall accuracy provides evidence of the errors generated in connection with the prediction of table regions using the example table body and table header models described in connection with FIG. 3.

Figure 6:
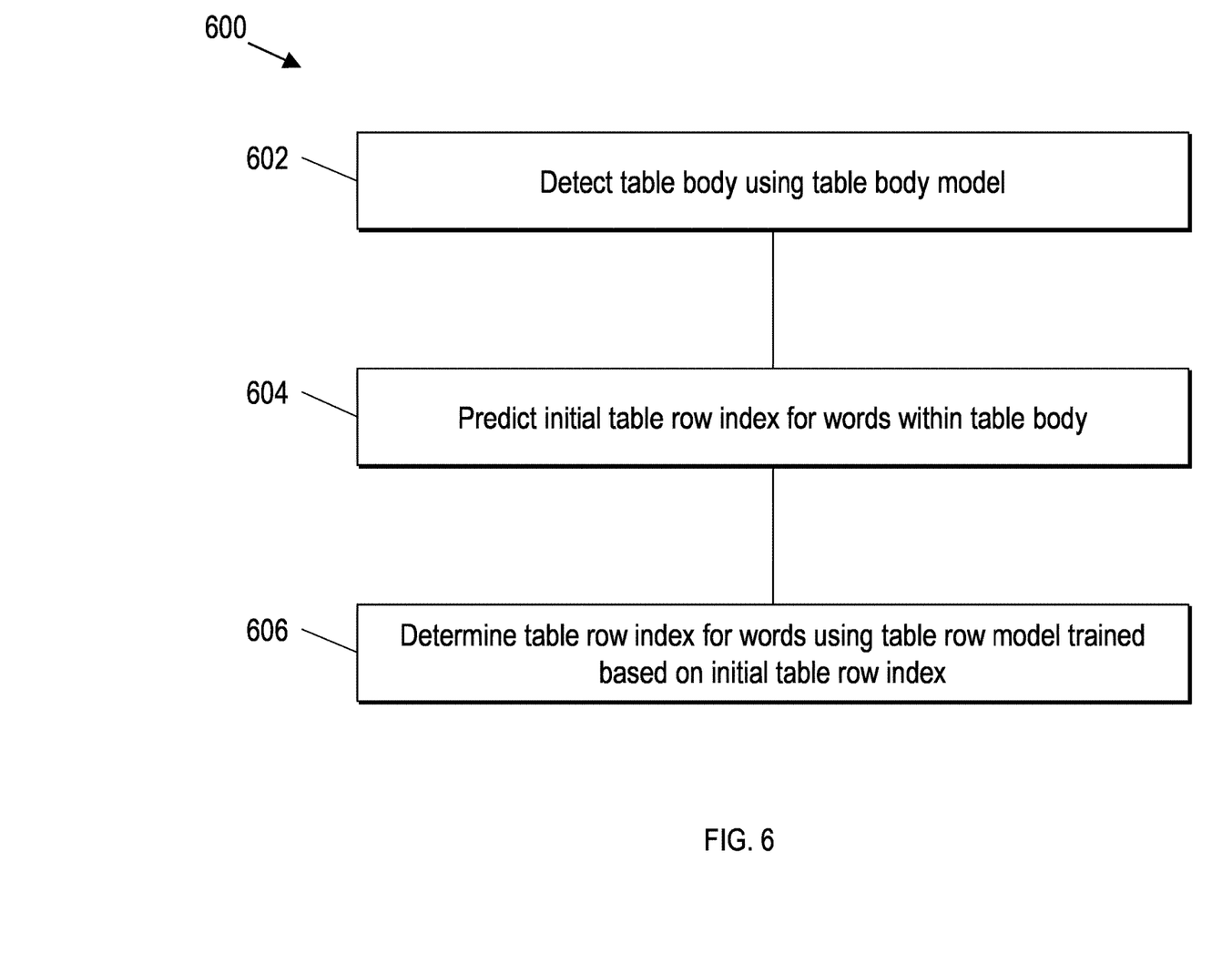
FIG. 6 illustrates aspects of a method for determining a table row index in accordance with example embodiments.

FIG. 6 shows aspects of a method for determining a table row index in accordance with example embodiments.

In this embodiment, the process 600 includes steps 602 through 606. These steps are assumed to be performed by the node 102 utilizing its elements 108, 110, 112, and 114 (FIG. 1).

In example embodiments, the method 600 includes detecting a table body in a document by processing the document using a table body model (step 602). In some embodiments, the table body model can be a computer vision model that is trained using supervised learning.

In example embodiments, the method 600 includes detecting a table header in the document by processing the document using a table header model. In some embodiments, the table header model can be a computer vision model that is trained using supervised learning.

In example embodiments, the method 600 includes predicting an initial table row index for words obtained in the documents, where the words are determined to be within the table body (step 604). In some embodiments, predicting the initial table row index can use a rule-based algorithm, such as the example rule-based algorithm described in connection with FIG. 4. In example embodiments, the document can be selected among a corpus of documents, each document in the corpus being annotated, and the words can be obtained by processing the document using optical character recognition and a word model trained based on the annotated documents. In alternative embodiments, the words can be obtained using a document-type-specific information extraction tool.

In example embodiments, the method 600 includes determining a table row index for the words using a table row model that is trained based on the predicted initial table row index for the words (step 606). In some embodiments, the table row model can be a graph neural network (GNN) model. In further embodiments, the table row model can be further trained using an error function that minimizes an error associated with determining a row transition based on the initial table row index for the words determined to be within the table body. In example embodiments, the table row model can be further trained based on determining whether the words are within the table header. In example embodiments, the document can be selected among a corpus of documents, and the table row model can be trained based on the initial table row index for the words in the documents in the corpus.

In example embodiments, the method 600 can include determining a table row for the words determined to be within the table body, based on the table row index. For example, the table row index can be a real number, and the determining the table row can include applying a rounding function to the table row index (e.g., to round the table row index up or down accordingly).

While the various steps in the method 600 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 600 of FIG. 6 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

As mentioned previously, at least portions of the information extraction system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 7. Although described in the context of system 100, these platforms may also be used to implement at least portions of other information processing systems in other embodiments.

Figure 7:
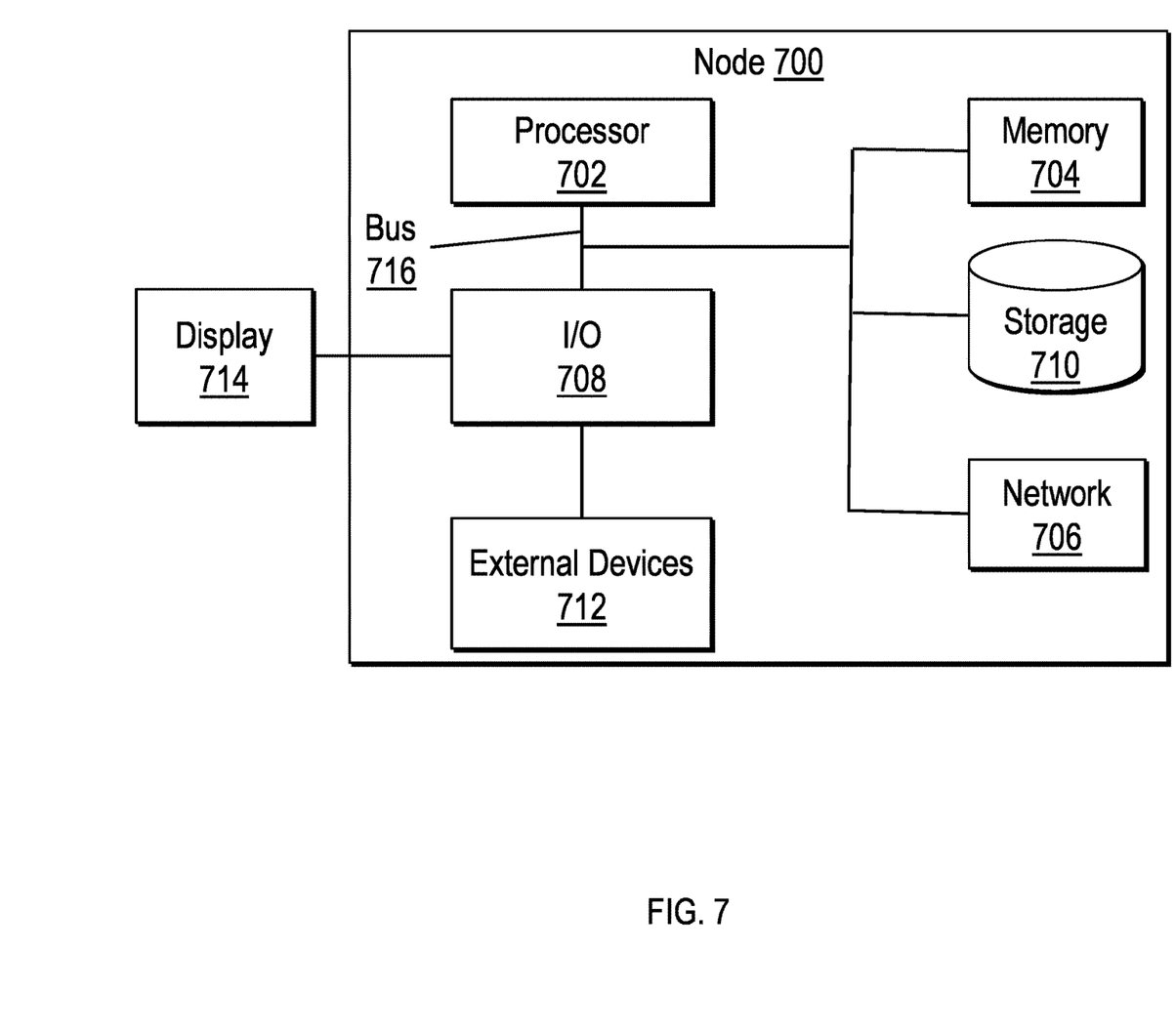
FIG. 7 illustrates aspects of a computing device or computing system in accordance with example embodiments.

FIG. 7 shows aspects of a computing device or a computing system in accordance with example embodiments. The computer 700 is shown in the form of a general-purpose computing device. Components of the computer may include, but are not limited to, one or more processors or processing units 702, a memory 704, a network interface 706, and a bus 716 that communicatively couples various system components including the system memory and the network interface to the processor.

The bus 716 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 700 typically includes a variety of computer-readable media. Such media may be any available media that is accessible by the computer system, and such media includes both volatile and non-volatile media, removable and non-removable media.

The memory 704 may include computer system readable media in the form of volatile memory, such as random-access memory (RAM) and/or cache memory. The computer system may further include other removable/non-removable, volatile/non-volatile computer system storage media. By way of example only, the storage system 710 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 716 by one or more data media interfaces. As has been depicted and described above in connection with FIGS. 1-6, the memory may include at least one computer program product having a set (e.g., at least one) of program modules that are configured to carry out the functions of the embodiments as described herein.

The computer 700 may also include a program/utility, having a set (at least one) of program modules, which may be stored in the memory 704 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 700 may also communicate with one or more external devices 712 such as a keyboard, a pointing device, a display 714, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 708. Still yet, the computer system may communicate with one or more networks such as a local area network (LAN), a general wide area network (WAN), and/or a public network (e.g., the Internet) via the network adapter 706. As depicted, the network adapter communicates with the other components of the computer system via the bus 716. It should be understood that although not shown, other hardware and/or software components could be used in conjunction with the computer system. Non-limiting examples include microcode, device drivers, redundant processing units, external disk drive arrays, Redundant Array of Independent Disk (RAID) systems, tape drives, data archival storage systems, etc.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the invention should be limited only by the appended claims.

What is claimed is:

1. A method comprising:
    detecting a table body in a document by processing the document using a machine learning (ML)-based table body model;
    predicting an initial table row index for one or more words among a plurality of words obtained in the document, wherein the one or more words are determined to be within the table body;
    determining a table row index for the one or more words using an ML-based table row model that is trained based on the predicted initial table row index for the one or more words, wherein the table row index is a real number; and
    applying a rounding function to the table row index to determine a table row for the one or more words determined to be within the table body based on the table row index.

2. The method of claim 1, wherein the table row model is a graph neural network (GNN) model.

3. The method of claim 1, wherein the table row model is further trained using an error function that minimizes an error associated with determining a row transition based on the initial table row index for the one or more words determined to be within the table body.

4. The method of claim 1, further comprising detecting a table header in the document by processing the document using an ML-based table header model.

5. The method of claim 4, wherein the table row model is further trained based on determining whether one or more words among the obtained words are within the table header.

6. The method of claim 4, wherein the table body model or the table header model is an ML-based computer vision model that is trained using supervised learning.

7. The method of claim 1,
    wherein the document is selected among a corpus of documents, and
    wherein the table row model is trained based on the initial table row index for the one or more words for the documents in the corpus.

8. The method of claim 1,
    wherein the document is selected among a corpus of documents, each document in the corpus being annotated, and
    wherein the plurality of words is obtained by processing the document using optical character recognition and an ML-based word model trained based on the annotated documents.

9. The method of claim 1, wherein the plurality of words is obtained using a document-type-specific information extraction tool.

10. A system comprising:
    at least one processing device including a processor coupled to a memory;
    the at least one processing device being configured to implement the following steps:
        detecting a table body in a document by processing the document using a machine learning (ML)-based table body model;
        predicting an initial table row index for one or more words among a plurality of words obtained in the document, wherein the one or more words are determined to be within the table body;
        determining a table row index for the one or more words using an ML-based table row model that is trained based on the predicted initial table row index for the one or more words, wherein the table row index is a real number; and
        applying a rounding function to the table row index to determine a table row for the one or more words determined to be within the table body based on the table row index.

11. The system of claim 10, wherein the table row model is further trained using an error function that minimizes an error associated with determining a row transition based on the initial table row index for the one or more words determined to be within the table body.

12. The system of claim 10, wherein the processing device is further configured to implement detecting a table header in the document by processing the document using an ML-based table header model.

13. The system of claim 12, wherein the table row model is further trained based on determining whether one or more words among the obtained words are within the table header.

14. The system of claim 12, wherein the table body model or the table header model is an ML-based computer vision model that is trained using supervised learning.

15. The system of claim 10,
wherein the document is selected among a corpus of documents, each document in the corpus being annotated, and
wherein the plurality of words is obtained by processing the document using optical character recognition and an ML-based word model trained based on the annotated documents.

16. A non-transitory processor-readable storage medium having stored therein program code of one or more software programs, wherein the program code when executed by at least one processing device causes the at least one processing device to perform the following steps:
detecting a table body in a document by processing the document using a machine learning (ML)-based table body model;
predicting an initial table row index for one or more words among a plurality of words obtained in the document, wherein the one or more words are determined to be within the table body;
determining a table row index for the one or more words using an ML-based table row model that is trained based on the predicted initial table row index for the one or more words, wherein the table row index is a real number; and
applying a rounding function to the table row index to determine a table row for the one or more words determined to be within the table body based on the table row index.

17. The storage medium of claim 16, wherein the document is unstructured.

18. The storage medium of claim 16, wherein the document is a purchase order.

19. The storage medium of claim 16, wherein the document is an inventory manifest.

20. The storage medium of claim 16, wherein the table body model is an ML-based deep neural network (DNN) model.

* * * * *